(12) United States Patent
Tang et al.

(10) Patent No.: US 9,113,365 B2
(45) Date of Patent: Aug. 18, 2015

(54) METHOD AND APPARATUS FOR OFFLOADING INTERNET DATA IN ACCESS NETWORK

(75) Inventors: Delong Tang, Shenzhen (CN); Zhigui Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 101 days.

(21) Appl. No.: 13/578,634

(22) PCT Filed: Apr. 22, 2011

(86) PCT No.: PCT/CN2011/073187
§ 371 (c)(1),
(2), (4) Date: Aug. 13, 2012

(87) PCT Pub. No.: WO2011/140898
PCT Pub. Date: Nov. 17, 2011

(65) Prior Publication Data
US 2012/0307736 A1    Dec. 6, 2012

(30) Foreign Application Priority Data

May 13, 2010  (CN) .......................... 2010 1 0183140

(51) Int. Cl.
*H04J 1/16*     (2006.01)
*H04W 28/08*    (2009.01)
*H04W 8/26*     (2009.01)

(52) U.S. Cl.
CPC ............... *H04W 28/08* (2013.01); *H04W 8/26* (2013.01)

(58) Field of Classification Search
CPC . H04W 28/00; H04W 28/02; H04W 28/0242; H04W 28/08; H04W 28/10; H04W 28/12
USPC .......................... 370/229–235, 241–252, 338
See application file for complete search history.

(56) References Cited

U.S. PATENT DOCUMENTS

2003/0189914 A1*  10/2003  Zhao ............................. 370/342
2009/0168675 A1    7/2009  Tao
(Continued)

FOREIGN PATENT DOCUMENTS

CN    101128047 A    2/2008
CN    101132330 A    2/2008

OTHER PUBLICATIONS

International Search Report on international application No. PCT/CN2011/073187, mailed on Jul. 28, 2011.
(Continued)

*Primary Examiner* — Kan Yuen
(74) *Attorney, Agent, or Firm* — Oppedahl Patent Law Firm LLC

(57) ABSTRACT

The present disclosure discloses a method and an apparatus for offloading Internet data in an access network, which are used for solving the technical problems that in a Network Address Translation (NAT) offloading networking solution, the information obtained in a monitor mode is incomplete, offloading characteristics for distinguishing users cannot be provided and offloading strategies are separated from Quality of Service (QoS) strategies of a core network. The solution of the present disclosure includes: an offloading device judges whether a Radio Access Bearer (RAB) data flow needs offloading according to a specific value of a specific parameter in an RAB message; if the offloading is needed, NAT is performed and then the offloaded data is transmitted to the Internet; and if the offloading is not needed, the RAB data flow is transparently transmitted to the core network. In the present disclosure, the offloading judgment condition, which the offloading device is in accordance with, directly originates from the core network, and the core network can proactively obtain required user information, thus offloading judgment can be made correctly and completely as much as possible, and offloading judgment can be implemented with QoS strategies of the core network together, and there is no need to add new QoS management points being independent of the core network.

6 Claims, 4 Drawing Sheets

(56) References Cited

U.S. PATENT DOCUMENTS

| | | |
|---|---|---|
| 2009/0207759 A1 | 8/2009 | Andreasen |
| 2010/0027533 A1 | 2/2010 | Kant |
| 2010/0077102 A1 | 3/2010 | Lim |
| 2010/0222058 A1* | 9/2010 | Pudney et al. ............. 455/435.2 |
| 2011/0075557 A1* | 3/2011 | Chowdhury et al. ......... 370/230 |
| 2012/0082090 A1* | 4/2012 | Horn et al. .................... 370/328 |

OTHER PUBLICATIONS

English Translation of the Written Opinion of the International Search Authority in international application No. PCT/CN2011/073187, mailed on Jul. 28, 2011.

Introduction of Selected IP Traffic Offload at Iu-PS Apr. 30, 2010.

* cited by examiner

Prior Art

Prior Art

METHOD AND APPARATUS FOR OFFLOADING INTERNET DATA IN ACCESS NETWORK

TECHNICAL FIELD

The present disclosure relates to the technical field of mobile communications, and more particularly to a method and an apparatus for offloading Internet data in an access network.

BACKGROUND

Currently, a structure of a mobile communication network is shown as FIG. 1; under the network structure, a data flow of a mobile user has to access Internet via an access network and a core network.

With abundant terrestrial transmission and a growing decrease in a transmission cost, a demand for traffic of the Internet and a requirement on a time delay of the Internet has been improved continuously, and a new networking mode is forming. FIG. 2 shows a structural diagram of a possible offloading networking; under the networking structure, a mobile user can either connect to the Internet via a core network by a traditional channel, or directly access the Internet from an access network through performing offloading at an IU interface (interconnection point between a Radio Network Controller (RNC) or a Base Station Controller (BSC) and a 3G core network, specifically referring to an interface between a 3rd wireless communication access network and a core network), thus achieving a higher data flow speed and a lower cost.

At present, this solution is still being argued by the $3^{rd}$ Generation Partnership Project (3GPP), and related protocols have not yet been determined.

There are two offloading solutions for the IU interface in the 3GPP, one of which is to deploy a Gateway General Packet Radio Service Support Node (GGSN) on an RNC and the other one of which is to deploy a Network Address Translation (NAT) device on the RNC.

The main features of the NAT solution are as follows: between the RNC and a core network, an offloading device judges whether a data flow needs offloading by means of monitoring a Non-Access Stratum (NAS) message and parsing information related to a Packet Data Protocol (PDP) in the NAS message, performs NAT for an original data flow if the offloading is needed, and then directly pushes the data flow to an Internet access point. The offloading judging method has the following disadvantages:

(1) information obtained in a monitor mode is incomplete, it is possible that a NAS message cannot provide complete user information, and offloading characteristics for distinguishing users cannot be provided; and (2) the offloading judging method is separated from a Quality of Service (QoS) strategy of a core network, and operators may have to define two QoS strategies, thus bringing difficulty for management.

SUMMARY

In view of the problem above, the main purpose of the present disclosure is to provide a method and an apparatus for offloading Internet data in an access network, which are used for solving the technical problems that in an Network Address Translation (NAT) offloading networking solution, information obtained in a monitor mode is incomplete, offloading characteristics for distinguishing users cannot be provided and an offloading strategy is separated from a Quality of Service (QoS) strategy of a core network.

To achieve the purpose above, the technical solution of the present disclosure is realized as follows.

A method for offloading Internet data in an access network is provided, which includes:

an offloading device judges whether a Radio Access Bearer (RAB) data flow needs offloading according to a value of a specific parameter in an RAB message; if the offloading is needed, then the offloading device performs Network Address Translation (NAT) and then transmits offloaded data to the Internet; and if the offloading is not needed, then the offloading device transmits the RAB data flow to a core network transparently.

Before offloading judgment, the method may further include that: a step in which the core network sets the specific parameter and the offloading device obtains the specific parameter, which specifically includes that:

the core network, when performing RAB assignment, sets the value of the specific parameter according to user information and/or Packet Data Protocol (PDP) information; the core network initiates an RAB establishment procedure at an IU interface and the offloading device obtains an RAB establishment message, parses and records the value of the specific parameter included in the RAB establishment message.

Further, the user information may be subscription information of a mobile user, or information indicating whether or not the mobile user is a roaming user; and the PDP information may be a Network Service Access Point Identifier (NSAPI) or an Access Point Name (APN) in the PDP information.

Further, the value of the specific parameter may include three value types, respectively indicating that offloading is necessary, offloading is not allowed and offloading is performed dynamically; and when the value of the specific parameter is a value indicating that offloading is performed dynamically, the offloading device dynamically judges whether a corresponding RAB needs offloading according to a system load.

Further, in the method, the offloading device and a radio controller may be configured as one single network element; after air interface de-encapsulation is performed on a data flow in an uplink direction, offloading judgment is directly made on the data flow in the uplink direction; and in a downlink direction, after NAT is performed on data from the Internet, the data from the Internet is directly sent to an air interface; or both the offloading device and the radio controller may be independent network elements; the offloading device may be deployed on an IU interface to monitor data between a Radio Network Controller (RNC) and the core network, perform NAT processing on data which is identified in need of offloading and transparently transmit data which does not need the offloading.

Based on the method above, the present disclosure further provides a device for offloading Internet data in an access network, wherein the device includes:

an offloading judgment module, located in an offloading device and configured to judge whether an RAB data flow needs offloading according to a value of a specific parameter in an RAB message; and an offloading processing module, located in the offloading device and configured to perform offloading processing according to a judgment result of the offloading judgment module, if the offloading is needed, perform NAT and then transmit data to the Internet, and if the offloading is not needed, transparently transmit the data to a core network.

Further, the device may include:
a parameter setting module, located in the core network and configured to, when performing RAB assignment, set the value of the specific parameter according to user information and/or PDP information; and
a parameter obtaining module, located in the offloading device and configured to, when the core network initiates an RAB establishment procedure via an IU interface, obtain and record the value of the specific parameter included in an RAB establishment message.

Further, the value of the specific parameter may include three value types, respectively indicating that offloading is necessary, offloading is not allowed and offloading is performed dynamically; and when the value of the specific parameter is a value indicating that the offloading is performed dynamically, the offloading judgment module dynamically judges whether a corresponding RAB needs offloading according to a system load.

Further, the offloading judgment module, the offloading processing module, the parameter obtaining module and the radio controller may be configured together in an independent network element, and the offloading judgment module may directly perform offloading judgment on the data flow in the uplink direction after air interface de-encapsulation is performed on a data flow in an uplink direction, and the offloading processing module performs NAT on a data flow in a downlink direction and then directly sends the data flow in the downlink direction to an air interface; or the offloading device consisting of the offloading judgment module, the offloading processing module and the parameter obtaining module, and the radio controller may be independent network elements; the offloading device may be deployed on the IU interface to monitor data between an RNC and the core network, perform NAT processing on data which is identified in need of offloading and transparently transmit data which does not need the offloading.

In the present disclosure, an offloading judgment condition, which the offloading device is in accordance with, directly originates from the core network, and the core network can proactively obtain required user information, thus offloading judgment can be made correctly and completely as much as possible and can be implemented with a QoS strategy of the core network uniformly, and there is no need to add a new QoS management point being independent of the core network.

DETAILED DESCRIPTION

To make the purpose, technical solution and advantages of the present disclosure clearer, the present disclosure will be further described in detail with reference to embodiments and attached drawings hereinafter.

Figure 1:
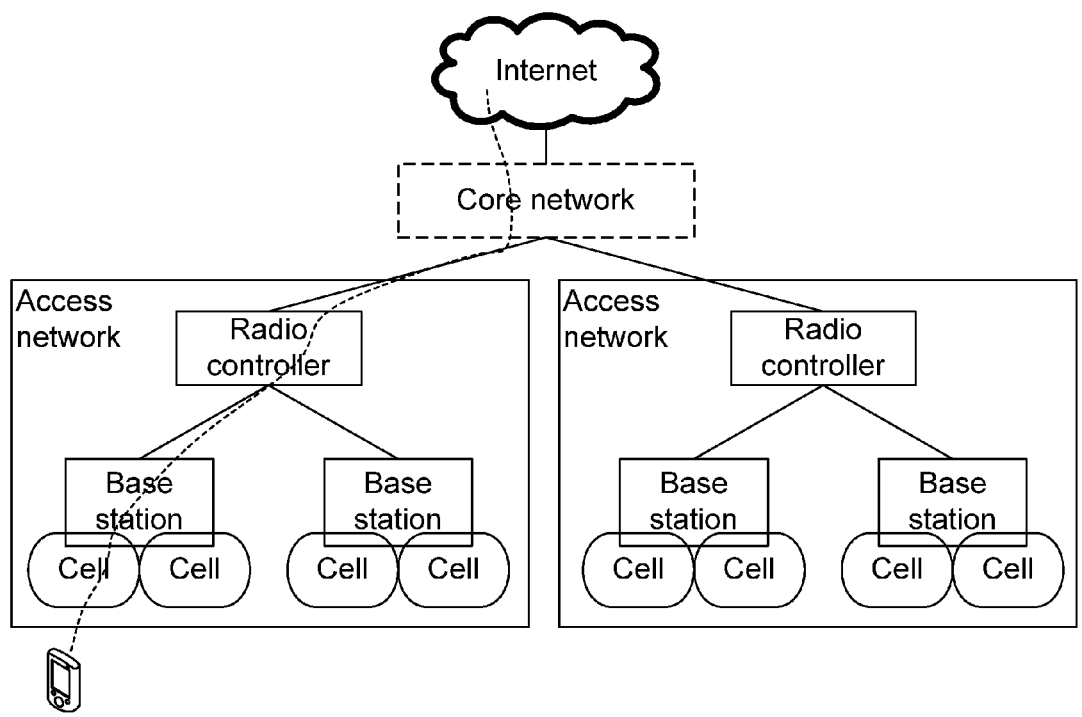
FIG. 1 is a structural diagram illustrating a mobile communication network.
Figure 2:
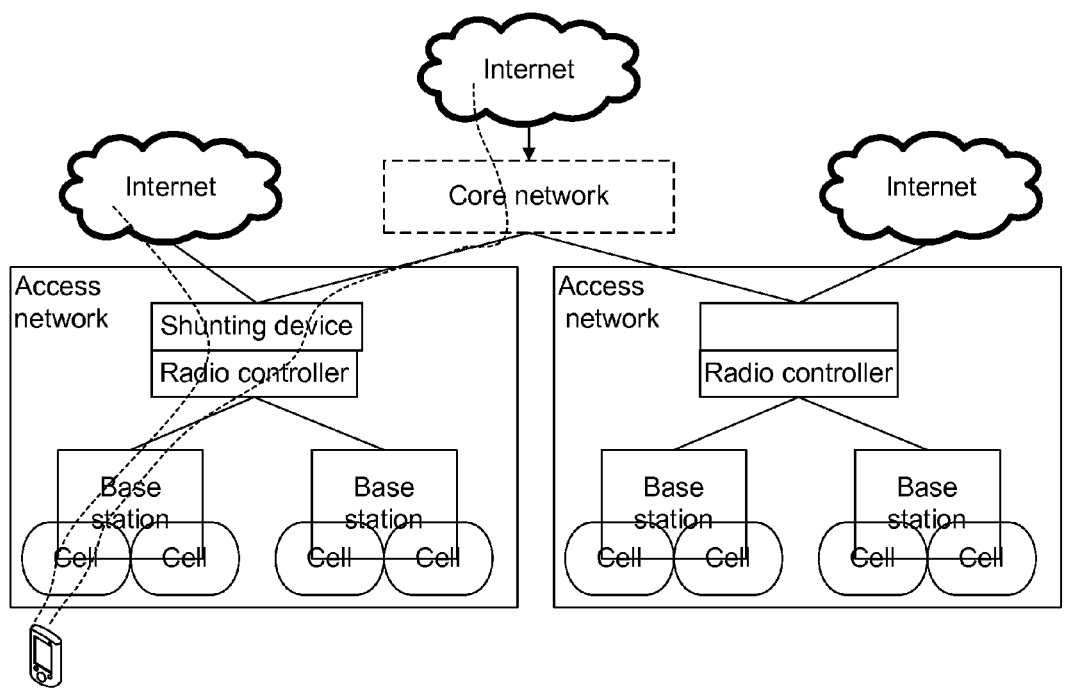
FIG. 2 is a structural diagram illustrating an offloading networking.
Figure 3:
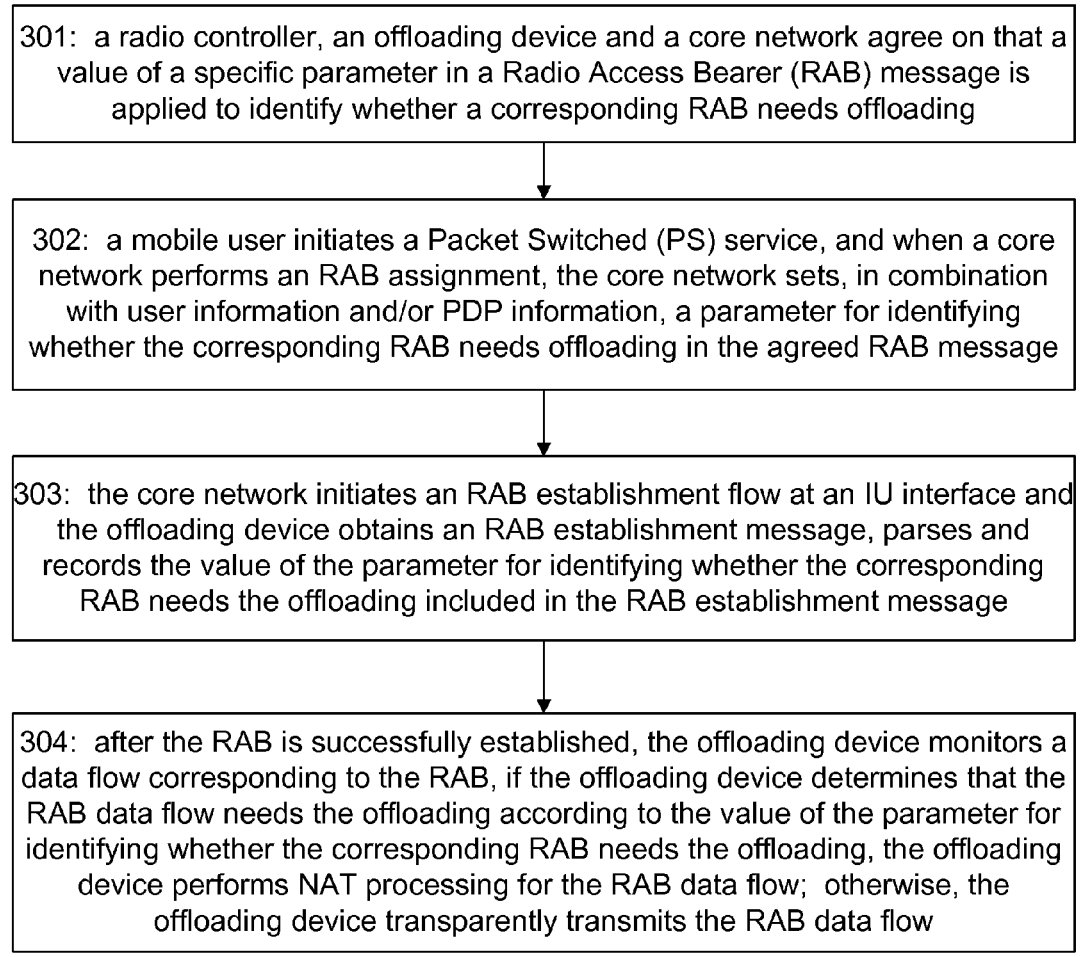
FIG. 3 is a flowchart diagram illustrating a method for offloading Internet data in an access network proposed in the disclosure.

FIG. 3 is a flowchart diagram illustrating a method for offloading Internet data in an access network proposed in the disclosure. The method specifically includes the following steps.

Step 301: a radio controller (for example, an RNC or a BSC), an offloading device and a core network set in advance a value of a specific parameter in a Radio Access Bearer (RAB) message to identify whether a corresponding RAB needs offloading;
preferably, the radio controller, the offloading device and the core network agree on that a Access Point Name (APN) in the RAB parameter is applied to identify whether the RAB data needs offloading; if there is no APN information in the RAB parameter, then the corresponding data is not allowed to be offloaded; otherwise, the corresponding data can be offloaded;
preferably, on the premise that there is an APN in the RAB parameter, it can be further agreed on that, when a value of a Traffic Handling Priority (THP) parameter or a value of an Allocation/Retention Priority (ARP) parameter is a specific value, the corresponding data must be offloaded; otherwise, the corresponding data may not be offloaded.

Step 302: a User Equipment (UE/mobile user) initiates a Packet Switched (PS) service, and when a core network performs an RAB assignment, the core network sets, in combination with user information and/or PDP information, a value of a parameter for identifying whether the corresponding RAB needs offloading in the agreed RAB message;
preferably, the PDP information refers to a Network Service Access Point Identifier (NSAPI) or an APN in the PDP information;
preferably, the user information is subscription information of the mobile user, or information indicating whether or not the mobile user is a roaming user; and the PDP information can be obtained from a Home Subscriber Server (HSS).

Step 303: the core network initiates an RAB establishment flow at an IU interface and the offloading device obtains an RAB establishment message, parses and records the value of the parameter for identifying whether the corresponding RAB needs the offloading included in the RAB establishment message;
preferably, the offloading device can obtain the value of the parameter for identifying whether the corresponding RAB needs the offloading by means of monitoring an RAB message on the IU interface or by means of proactive notification of an RNC.

Step 304: after the RAB is successfully established, the offloading device monitors a data flow corresponding to the RAB, if the offloading device determines that the RAB data flow needs the offloading according to the value of the parameter for identifying whether the corresponding RAB needs the offloading, the offloading device performs NAT processing for the RAB data flow; otherwise, the offloading device transparently transmits the RAB data flow.
preferably, the value of the parameter for identifying whether the corresponding RAB needs the offloading includes three value types, respectively indicating that offloading is necessary, offloading is not allowed and offloading is performed dynamically; when the value of the specific parameter is a value indicating that the offloading is performed dynamically, the offloading device can dynamically judge whether a corresponding RAB needs offloading according to a load of a IU interface.

A process of an offloading judgment method of the present disclosure will be described with reference to an example hereinafter. In the example, a radio controller is an RNC, and the steps are specifically as follows.

Step 401: an RNC, a core network, and an offloading device agree on that data can be offloaded when an APN exists in an RAB parameter; otherwise, data is not allowed be offloaded; on the premise that the APN exists, a value, which is 6 to 10, of a THP parameter, represents that the offloading is performed dynamically; the offloading device determines whether to perform the offloading according to a system load, and a value of 11 to 14 represents that the offloading is necessary.

Step 402: a setting rule of configuration parameters at a core network side is that: the core network sets a value of an offloading parameter according to subscription information of a terminal user and PDP information, and when the terminal is subscribed as a high value user or the APN is A, the core network sets the value of the offloading parameter as the parameter value indicating that the offloading is not allowed, in other words, there is no APN information in the RAB parameter; when the terminal is subscribed as a low value user or the APN is B, then the core network sets the value of the offloading parameter as the parameter value indicating that the offloading is necessary, in other words, the THP in the RAB parameter is any one of values 11 to 14 (the specific value is determined according to a user priority or a service priority, which does not be described in the present disclosure). If the terminal is subscribed as a medium value user or the APN is other value, then the core network sets the value of the offloading parameter as the parameter value indicating that the offloading is performed dynamically, in other words, the THP is any one of values 6 to 10. An offloading priority can be further arranged for dynamic offloading, for example, the APN offloading priority is C>D>E, then the THP parameter corresponds to 8, 7, 6 respectively.

Step 403: the UE initiates a PDP activation request to the core network, after receiving the PDP activation request, the core network parses APN information in the PDP activation request, sets the APN value in the RAB parameter as null when the APN is A, sets the APN in the RAB parameter as B and the THP parameter as any one of values 11 to 14 when the APN is B, and sets the APN in the RAB value as C, D or E and the THP value as 8, 7 or 6 when the APN is C, D or E.

Step 404: the core network establishes an RAB channel for the corresponding RAB request, and sends an RAB establishment request to the RNC via an IU interface; the offloading device reads the APN and THP parameter information via the IU interface, and records the parameter information of the RAB, which includes the value of the THP parameter.

Step 405: after the RAB is successfully established, the UE begins to transmit data.

Step 406: when a data flow passes through the offloading device, the offloading device judges, according to the recorded RAB parameter information, whether the RAB to which the data flow belongs needs the offloading, and, when the value of the offloading parameter is the value indicating that the offloading is necessary, the offloading device allocates NAT resource for the RAB, performs IU de-encapsulation for the user data flow, performs NAT processing for the user data flow, and sends the user data flow to an Internet access point; when the value of the offloading parameter is the value indicating that the offloading is not allowed, the offloading device transparently transmits the data flow to the core network; when the value of the offloading parameter is the value indicating that the offloading is performed dynamically, the offloading device monitors a transmission load of the IU interface, for example, when the load of the IU interface reaches 70%, the offloading device does not perform the offloading for the RAB whose value of the offloading parameter is 8, and performs the offloading for other RABs; when the load reaches 80%, the offloading device does not perform the offloading for the RAB whose value of the offloading parameter is 7; when the load reaches 90%, the offloading device does not perform the offloading for the RAB whose THP value is 6 and perform the offloading processing for other RABs.

Step 407: the offloading device does not monitor downlink data of the core network, and transparently transmits downlink data of the core network to the RNC; and performs NAT on a message from an Internet access point, encapsulates the message and sends the message encapsulated to the RNC.

Step 408: the offloading device monitors an RAB releasing message, and releases the NAT resource after the RAB is released.

In a preferred embodiment of the present discloser, both the offloading device and the RNC can be combined as a single network element; when the offloading device and the RNC are combined, after air interface de-encapsulation is performed on an uplink data flow, an offloading judgment is performed, and when the offloading is needed, NAT processing is directly performed without processing of IU interface encapsulation and de-encapsulation; in a downlink direction, the NAT is performed on data from the Internet, and then the data is directly sent to an air interface, and the processing of IU interface encapsulation and de-encapsulation are not needed similarly. Therefore, an efficiency of the offloading processing is increased.

Figure 4:
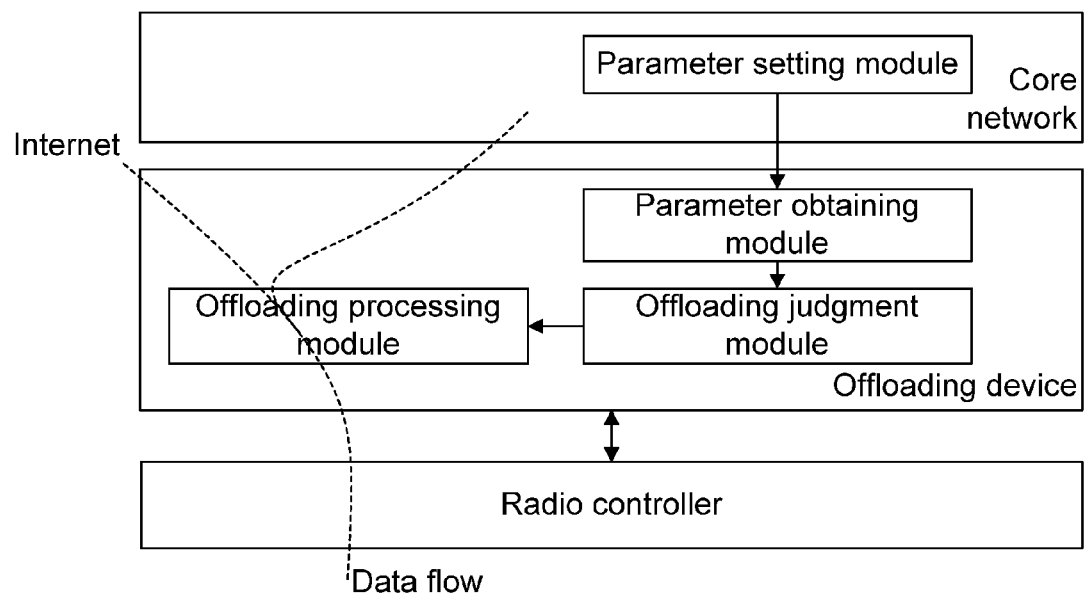
FIG. 4 is a structural schematic diagram illustrating a device for offloading Internet data in an access network proposed in the present disclosure.

FIG. 4 is a structural schematic diagram illustrating a device for offloading Internet data in an access network provided in the present disclosure. The device includes:

a parameter setting module, located in a core network and configured to, when performing RAB assignment, set a value of a specific parameter according to user information and/or PDP information, wherein the user information refers to subscription information of a mobile user, or information indicating whether or not the mobile user is a roaming user; the PDP information is an NSAPI or an APN in the PDP information; and the specific parameter is a THP parameter or an ARP parameter;

a parameter obtaining module, located in an offloading device and configured to, when the core network initiates an RAB establishment procedure via an IU interface, obtain and record the value of the specific parameter included in an RAB establishment message;

an offloading judgment module, located in the offloading device and configured to judge whether an RAB data flow needs offloading according to a specific value of a specific parameter in an RAB message; and an offloading processing module, located in the offloading device and configured to perform offloading processing according to a judgment result of the offloading judgment module, if the offloading is needed, perform NAT and then transmit data to the Internet, and if the offloading is not needed, transparently transmit data to the core network.

Preferably, the offloading judgment module, the offloading processing module, the parameter obtaining module and the radio controller are configured together in an independent network element, after air interface de-encapsulation is performed on a data flow in an uplink direction, the offloading judgment module directly performs the offloading judgment on the data flow in the uplink direction; and the offloading processing module performs NAT for a data flow in a downlink direction, and then directly sends the data flow in the downlink direction to an air interface; the offloading device consisting of the offloading judgment module, the offloading processing module and the parameter obtaining module and the radio controller can be further configured as a respective independent network element, the offloading device is deployed on a IU interface to monitor data between an RNC and the core network, performs the NAT processing for data which is identified in need of the offloading and transparently transmits data which does not need the offloading.

The present disclosure is applicable to a 3G wireless communication network, and similar processing can be further performed for a Long Term Evolution (LTE) Network.

The above are only the preferred embodiments of the present disclosure and are not intended to limit the scope of protection of the present disclosure.

The invention claimed is:

1. A method for offloading Internet data in an access network, comprising:
   judging, by an offloading device located on an IU interface between a access network and a core network, whether a Radio Access Bearer (RAB) data flow needs offloading according to a value of a specific parameter in an RAB message; when the offloading is needed, then performing Network Address Translation (NAT) and then transmitting offloaded data to the Internet by the offloading device; and when the offloading is not needed, then transparently transmitting the RAB data flow to the core network by the offloading device;
   wherein the method further comprising a step of setting the specific parameter by the core network and obtaining the specific parameter by the offloading device before offloading judgment, specifically:
   a User Equipment (UE) initiates a Packet Switched (PS) service, the core network, when performing RAB assignment, sets the value of the specific parameter according to user information and/or Packet Data Protocol (PDP) information; the core network initiates an RAB establishment procedure at the IU interface between the access network and the core network, and the offloading device obtains an RAB establishment message, parses and records the value of the specific parameter included in the RAB establishment message; wherein the value of the specific parameter is set by a network element Serving GPRS Support Node (SGSN) at the core network, the RAB establishment procedure is initiated from the SGSN to a Radio Network Controller (RNC) at the access network;
   wherein the value of the specific parameter comprises three value types, respectively indicating that offloading is necessary, offloading is not allowed and offloading is performed dynamically; when the value of the specific parameter is a value indicating that the offloading is performed dynamically, the offloading device dynamically judges whether a corresponding RAB needs offloading according to a system load.

2. The method according to claim 1, wherein
   the user information is subscription information of a mobile user, or information indicating whether or not the mobile user is a roaming user; the PDP information is a Network Service Access Point Identifier (NSAPI) or an Access Point Name (APN) in PDP information.

3. The method according to claim 1, wherein
   the offloading device and a radio controller are configured as one single network element; after air interface de-encapsulation is performed on a data flow in an uplink direction, offloading judgment is directly made on the data flow in the uplink direction; and in a downlink direction, after NAT is performed on data from the Internet, the data from the Internet is directly sent to an air interface; or
   both the offloading device and the radio controller are independent network elements, the offloading device is deployed on an IU interface to monitor data between a Radio Network Controller (RNC) and the core network, perform NAT processing on data which is identified in need of offloading and transparently transmit data which does not need the offloading.

4. A device for offloading Internet data in an access network, the device is located on an IU interface between the access network and a core network, comprising:
   an offloading judgment module, configured to judge whether a Radio Access Bearer (RAB) data flow needs offloading according to a value of a specific parameter in an RAB message; and
   an offloading processing module, configured to perform offloading processing according to a judgment result of the offloading judgment module, when the offloading is needed, perform NAT and then transmit data to the Internet, and when the offloading is not needed, transparently transmit the data to the core network;
   a parameter setting module configured to, a User Equipment (UE) initiates a Packet Switched (PS) service, when performing RAB assignment, set the value of the specific parameter according to user information and/or Packet Data Protocol (PDP) information; and
   a parameter obtaining module configured to, when the core network initiates an RAB establishment procedure via the IU interface, obtain and record the value of the specific parameter included in an RAB establishment message;
   wherein the value of the specific parameter is set by a network element Serving GPRS Support Node (SGSN) at the core network, the RAB establishment procedure is initiated from the SGSN to a Radio Network Controller (RNC) at the access network;
   wherein the value of the specific parameter comprises three value types, respectively indicating that offloading is necessary, offloading is not allowed and offloading is performed dynamically; when the value of the specific parameter is a value indicating that offloading is performed dynamically, the offloading judgment module dynamically judges whether a corresponding RAB needs offloading according to a system load.

5. The device according to claim 4, wherein the user information is subscription information of a mobile user, or information indicating whether or not the mobile user is a roaming user; the PDP information is a Network Service Access Point Identifier (NSAPI) or an Access Point Name (APN) in PDP information.

6. The device according to claim 4, wherein an offloading device consisting of the offloading judgment module, the offloading processing module, and the parameter obtaining module and a radio controller are configured together in an single network element, and the offloading judgment module directly performs offloading judgment on a data flow in an uplink direction after air interface de-encapsulation is performed on the data flow in the uplink direction, and the offloading processing module performs NAT on a data flow in a downlink direction and then directly sends the data flow in the downlink direction to an air interface; or
   the offloading device consisting of the offloading judgment module, the offloading processing module and the parameter obtaining module, and the radio controller are independent network elements; the offloading device is deployed on the IU interface to monitor data between a Radio Network Controller (RNC) and the core network, performs NAT processing on data which is identified in need of offloading and transparently transmits data which does not need the offloading.

\* \* \* \* \*